(12) United States Patent
Vinje

(10) Patent No.: US 11,204,666 B2
(45) Date of Patent: Dec. 21, 2021

(54) TECHNIQUES FOR WIDEBAND TOUCH SENSING AND RELATED SYSTEMS, METHODS AND DEVICES

(71) Applicant: Atmel Corporation, Chandler, AZ (US)

(72) Inventor: Anders Vinje, Trondheim (NO)

(73) Assignee: Atmel Corporation, Chandler, AZ (US)

( * ) Notice: Subject to any disclaimer, the term of this patent is extended or adjusted under 35 U.S.C. 154(b) by 0 days.

(21) Appl. No.: 16/946,567

(22) Filed: Jun. 26, 2020

(65) Prior Publication Data

US 2021/0034219 A1    Feb. 4, 2021

Related U.S. Application Data

(60) Provisional application No. 62/882,393, filed on Aug. 2, 2019.

(51) Int. Cl.
    G06F 3/041    (2006.01)
    G06F 3/044    (2006.01)

(52) U.S. Cl.
    CPC .......... *G06F 3/04182* (2019.05); *G06F 3/044* (2013.01)

(58) Field of Classification Search
    CPC .............................. G06F 3/04182; G06F 3/044
    USPC ........................................................ 345/156
    See application file for complete search history.

(56) References Cited

U.S. PATENT DOCUMENTS

| | | |
|---|---|---|
| 2011/0012618 A1 | 1/2011 | Teierwak et al. |
| 2012/0256855 A1 | 10/2012 | Chan et al. |
| 2018/0253183 A1 | 9/2018 | Imanilov |
| 2018/0253184 A1* | 9/2018 | Imanilov ............. G06F 3/04182 |
| 2018/0253185 A1* | 9/2018 | Imanilov ............. G06F 3/04182 |

FOREIGN PATENT DOCUMENTS

| | | |
|---|---|---|
| EP | 3015960 A1 | 5/2016 |
| EP | 3287882 A1 | 2/2018 |
| KR | 10-2011-0105022 A | 9/2011 |

OTHER PUBLICATIONS

International Search Report from International Application No. PCT/US2020/070198, dated Nov. 20, 2020, 7 pages.
International Written Opinion from International Application No. PCT/US2020/070198, dated Nov. 20, 2020, 10 pages.

* cited by examiner

*Primary Examiner* — Albert K Wong
(74) *Attorney, Agent, or Firm* — TraskBritt

(57) ABSTRACT

A touch sensing method is described as well as related methods and systems. In some embodiments of the touch sensing method, energy of a drive signal is allocated among frequencies of RF subcarriers such that the allocated energy meets electromagnetic emissions requirements for the application of a touch sensing system implementing the touch sensing method. Also described are methods of determining a spectrally shaped time domain digital waveform for use in generating a spectrally shaped drive signal.

11 Claims, 7 Drawing Sheets

TECHNIQUES FOR WIDEBAND TOUCH SENSING AND RELATED SYSTEMS, METHODS AND DEVICES

CROSS-REFERENCE TO RELATED APPLICATION

This application claims under 35 USC § 119 the benefit of, and priority to, the earlier filing date of U.S. Provisional Patent Application 62/882,393, filed Aug. 2, 2019 and entitled "AN OFDM-BASED APPROACH TO WIDEBAND TOUCH SENSING," the entire content and disclosure of which is hereby incorporated herein by this reference.

TECHNICAL FIELD

Disclosed embodiments relate, generally, to touch sensing and controllers for capacitive touch sensing.

BACKGROUND

A typical touch interface system may incorporate touch sensors (e.g., capacitive sensors and/or resistive sensors, without limitation) that respond to an object in close proximity to, or physical contact with, a contact sensitive surface of a touch interface system. Such responses may be captured and interpreted to infer information about the contact, including a location of an object relative to the touch interface system.

Touchpads used with personal computers, including laptop computers and keyboards for tablets, often incorporate or operate in conjunction with a touch interface system. Displays often include touch screens that incorporate elements (typically at least a touch sensor) of a touch interface system to enable a user to interact with a graphical user interface (GUI) and/or computer applications. Examples of devices that incorporate a touch display include portable media players, televisions, smart phones, tablet computers, personal computers, and wearables such as smart watches, just to name a few. Further, control panels for automobiles, appliances (e.g., an oven, refrigerator or laundry machine) security systems, automatic teller machines (ATMs), residential environmental control systems, and industrial equipment may incorporate touch interface systems with displays and housings, including to enable buttons, sliders, wheels, and other touch elements.

BRIEF DESCRIPTION OF THE DRAWINGS

The purpose and advantages of the various embodiments of the disclosure will be apparent to one of ordinary skill in the art from the detailed description in conjunction with the appended figures.

DETAILED DESCRIPTION

Figure 1:
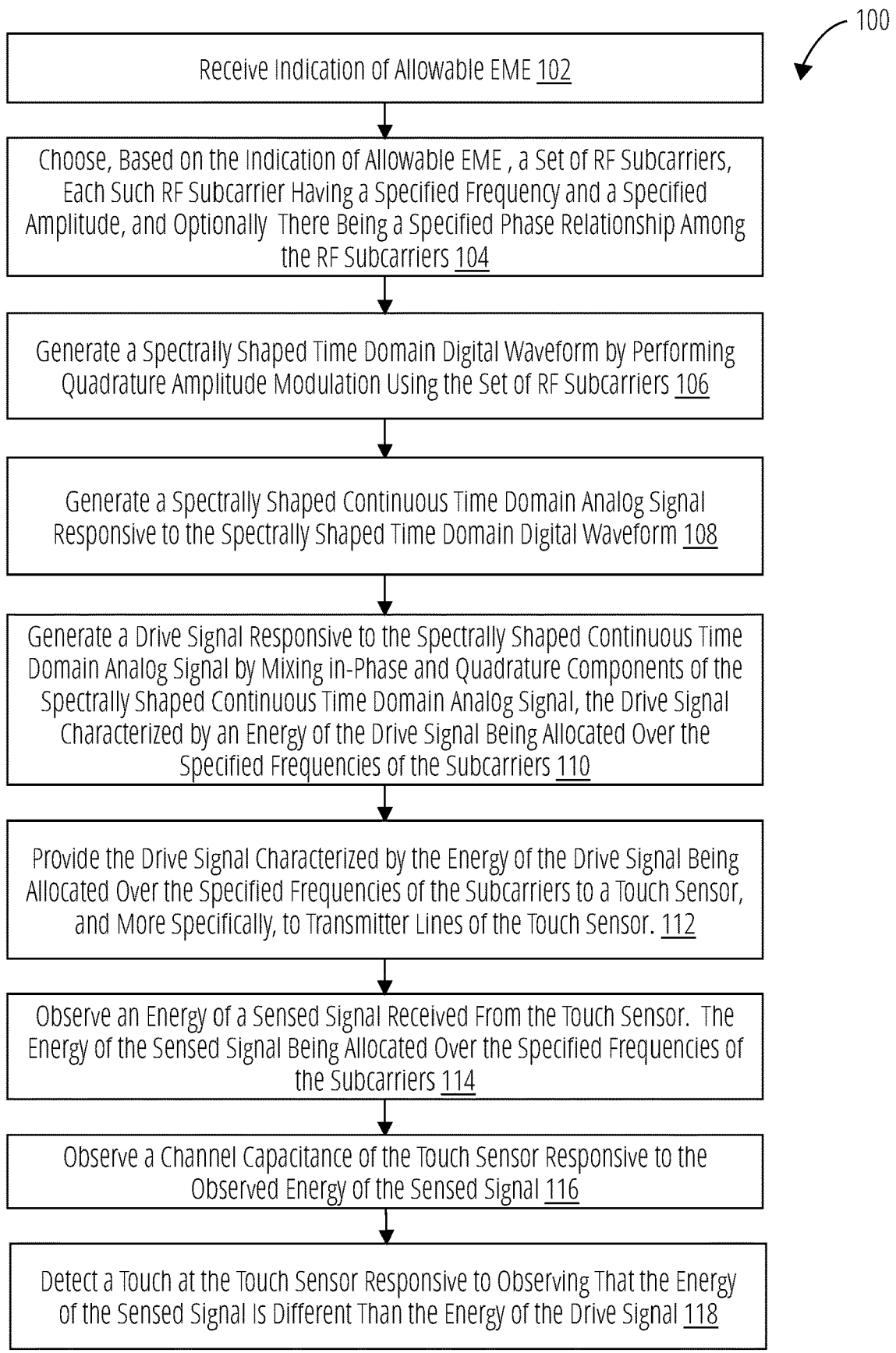
FIG. 1 is a process for generating a spectrally shaped drive signal in accordance with one or more embodiments of the disclosure.

In the following detailed description, reference is made to the accompanying drawings, which form a part hereof, and in which are shown, by way of illustration, specific example embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawings may be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

Thus, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Information and signals described herein may be represented using any of a variety of different technologies and techniques. For example, data, instructions, commands, information, signals, bits, and symbols that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

It should be understood that any reference to an element herein using a designation such as "first," "second," and so forth does not limit the quantity or order of those elements, unless such limitation is explicitly stated. Rather, these designations are used herein as a convenient method of distinguishing between two or more elements or instances of an element. Thus, a reference to first and second elements does not mean that only two elements can be employed or that the first element must precede the second element in some manner. Also, unless stated otherwise a set of elements may comprise one or more elements. Likewise, sometimes elements referred to in the singular form may also include one or more instances of the element.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field-Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

Also, it is noted that the embodiments may be described in terms of a process that is depicted as a flowchart, a flow diagram, a structure diagram, or a block diagram. Although a flowchart may describe operational acts as a sequential process, many of these acts may be performed in another sequence, in parallel, or substantially concurrently. In addition, the order of the acts may be re-arranged. A process may correspond to a method, a thread, a function, a procedure, a subroutine, and/or a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

As understood for purposes of the embodiments described in this disclosure, a capacitive sensor may respond to an object's (such as a finger or a stylus, without limitation) contact with, or the object's proximity to, a contact-sensitive area of the capacitive sensor. In this disclosure "contact" and "touch" are meant to encompass both an object's physical contact with a contact-sensitive area (e.g., an electrode or one or more overlays covering an electrode or group of electrodes, without limitation) and an object's presence within proximity of a contact-sensitive area without physical contact. Actual physical contact with a capacitive sensor is not necessarily required.

By way of an example, when an object contacts a capacitive sensor, a change in capacitance may occur within the capacitive sensor at or near the location of the contact. An analog acquisition front-end may detect the contact if it meets a certain threshold. "Charge-then-transfer" is a non-limiting example of a technique implemented in some touch-acquisition front-ends for detecting capacitive changes, whereby a sensing capacitor is charged responsive to a change in capacitance (e.g., charged faster or slower) and a charge is transferred to an integrating capacitor over multiple charge-transfer cycles. An amount of charge associated with such a charge-transfer may be converted to digital signals by an analog-to-digital converter (ADC), and a digital controller may process those digital signals (typically referred to as "delta counts" or just "deltas") to determine measurements and/or detect if an object contacted a sensor.

Self-capacitance sensors (also referred to herein as "self-cap sensors") are capacitive field sensors that respond to changes in capacitance to ground. They are typically laid out in an array of rows and columns that react independently to a touch. By way of non-limiting example, a self-cap sensor may include a circuit employing repetitive charge-then-transfer cycles using common integrated CMOS (i.e., Complementary Metal Oxide Semiconductor) push-pull driver circuitry having floating terminals.

Mutual capacitance sensors are capacitive field sensors that detect/respond to changes in capacitance between two electrodes: a drive electrode and a sense electrode. The drive electrode and sense electrode pairs at each intersection of drive and sense lines form a capacitor. Self-capacitance and mutual capacitance techniques may be used in the same touch interface system, and complimentary to each other, for example, self-capacitance may be used to confirm a touch detected using mutual capacitance.

As an example, touch sensors may be overlaid in a 2-dimensional (2-D) arrangement for a 2-D contact sensitive surface, for example, of a touch pad or a display screen, and may facilitate user interaction with an associated appliance or device. Insulating protective layers (e.g., resins, glass, and/or plastic, without limitation) may be used to cover touch sensors and may be referred to herein as an "overlay." A "touch display" is a display (such as a liquid crystal display (LCD), thin-film-transistor (TFT) LCD, or a light emitting diode (LED) display) that incorporates 2-D touch sensors, as a non-limiting example, implemented in a transparent medium over a display, sometimes with an additional transparent medium such as glass in front of the touch sensors.

Using the example of a touch sensor that uses a matrix sensor approach of mutual capacitance sensors employing charge-transfer techniques, drive electrodes may extend in rows on one side of a substrate and sense electrodes may extend in columns on the other side of the substrate so as to define a "matrix" array of N by M nodes. Each node corresponds to an intersection between the electrically conductive lines of a drive electrode and of a sense electrode. A drive electrode simultaneously drives all of the nodes in a given row and a sense electrode senses all of the nodes in a given column. The capacitive coupling of the drive electrode and sense electrode (mutual capacitance), or the coupling of a sense electrode and ground (self-capacitance), at a node position may be separately measured or both measured in response to a capacitive change indicative of a touch event. For example, if a drive signal is applied to the drive electrode of row 2 and a sense electrode of column 3 is active then the node position is: row 2, column 3. Nodes may be scanned by sequencing through different combinations of drive and sense electrodes. In one mode the drive electrodes may be driven sequentially while the sense electrodes are all continuously monitored. In another mode each sense electrode may be sampled sequentially.

Using the example of a touch sensor that uses a matrix sensor approach of self-capacitance sensors, electrodes may extend in rows and columns to define a "matrix" array of N by M nodes. The matrix sensor may be constructed with an electrode at each node, each electrode being individually addressable, or each row and column may be an addressable electrode and each node corresponds to a unique row/column pair. A drive signal (i.e., an alternating current (A/C) stimulus) is repeatedly provided to the electrodes of the sensor. When an object contacts the sensor, coupling between the object and the electrodes changes (i.e., increases or decreases, as a non-limiting example depending on whether the object is electrically grounded or electrically floating) the current drawn on the electrodes which increases the apparent sensor capacitance, and this increase in sensor capacitance may be detected. For example, if an increase in capacitance is detected while a drive signal is applied to electrode row 2 and electrode column 3, then the location of a touch may be row 2, column 3. Interpolation techniques may be used to identify locations between nodes. Nodes may be scanned sequentially by sequencing through combinations of rows and columns of electrodes.

Drive signals (i.e., the A/C stimulus) described above are one cause of electromagnetic emissions (EME). Capacitance is typically measured synchronously with drive signals. So, there is a direct relationship between a sampling rate of a measurement and frequency of emission of EME.

By way of non-limiting example, microcontrollers, digital logic circuits, and configurable state machines may be configured to perform functions of acquisition circuitry and touch controllers described herein, such as controlling drive electrodes, monitoring sense electrodes, analyzing capacitive effects (e.g., detected from measured changes in channel capacitance and/or absolute channel capacitance, without limitation) on a touch sensor, and processing and reporting touches more generally, without limitation. Integrated Circuit (IC) packages that include a microcontroller may provide the input and output pins to communicate with a host; as well as the firmware to perform techniques and operations, including those described herein, in connection with various embodiments.

Some embodiments relate, generally, to systems and methods for providing drive signals to a touch sensor. In particular, a drive signal may be generated whereby the total energy of the touch sensing stimuli (i.e., the A/C signal) is allocated over multiple frequencies. In one embodiment, spectral shaping may be performed to generate a drive signal characterized by a total energy allocated over multiple specified frequencies.

Some embodiments relate, generally, to systems and methods for performing spectral shaping of a drive signal responsive to, as a non-limiting example, application-specific requirements. As a non-limiting example, target application-specific requirements may be requirements for noise immunity and/or limits on electromagnetic emissions. As used herein "spectral characteristics" means one or more of noise, electromagnetic emissions, or energy; and "allowable spectral characteristics" are spectral characteristics within specified limits or requirements.

In one embodiment, radio frequency (RF) signals are generated each corresponding to a different specified frequency (i.e., component frequencies). Each of the RF signals is generated responsive to an encoded digital signal having a specified amplitude. In one embodiment, the component frequencies may be pre-chosen based, at least in part, on application-specific requirements for the component frequencies and/or a given component frequency. As a non-limiting example, one or more of the component frequencies for the RF signals may be chosen because those component frequencies are associated with the highest EME limits relative to other available frequencies. Alternatively or additionally, one or more of the component frequencies of the RF signals may be chosen because those component frequencies have the lowest noise immunity requirements. (i.e., least restrictive noise immunity requirements) of the available frequencies. In one embodiment, the RF signals may be generated using a digital modulation scheme. Non-limiting examples of digital modulation schemes include quadrature amplitude modulation (QAM) or phase-shift keying.

FIG. 1 shows a touch sensing process 100 that uses a spectrally shaped drive signal for a touch sensor, such spectral shaping configured to allocate energy of a drive signal among multiple frequencies, in accordance with in one or more embodiments. As discussed herein, the energy allocated to specific frequencies may be chosen such that, for a given frequency, the attributable EME is within an allowable EME. Notably, in a given touch sensing operation, amounts of energy allocated to specific frequencies may be the same or may be different. As a non-limiting example, amounts of allocated energy may be different because different frequencies may have different allowable EME.

Process 100 may be understood to include at least two constituent processes, a first process including operations 102, 104, and 106 for generating a spectrally shaped time domain digital waveform, and a second process that includes operations 108, 110, 112, 114, 116 and 118 for performing a touch sensing operation to detect a touch at a touch sensor. There is no requirement that both of the two constituent processes be performed, and the first process may be performed without the second process, or without portions of the second process, or the second process may be performed without the first process, without exceeding the scope of this disclosure. For example, operations 102, 104, 106 and 118 may be performed without requiring operations 108, 110, 112, 114 and 116.

At operation 102, process 100 receives an indication of an allowable EME. In various embodiments, allowable EME may include allowable EME for a number of specified frequencies. As a non-limiting example, specified frequencies may include one or more of individual frequencies and/or frequency bands.

At operation 104, process 100 chooses, based on the indication of allowable EME, a set of RF subcarriers. Each such RF subcarrier has a specified frequency and a specified amplitude. Choosing an RF subcarrier may involve choosing a frequency and an amplitude for the RF subcarrier. In some embodiments, a phase relationship among chosen frequencies may also be chosen (i.e., a specified phase relationship may be chosen). A specified phase relationship may be, to some extent, a degree of orthogonality (by way of example, completely orthogonal RF subcarriers have a phase shift of 90 degrees) of the phases of respective subcarriers such that at least some of the energy of each RF subcarrier is out of phase with other RF subcarriers.

At operation 106, process 100 generates a spectrally shaped time domain digital waveform. In some embodiments, process 100 generates the spectrally shaped time domain digital waveform by performing a static amplitude quadrature amplitude modulation using the chosen set of RF subcarriers. In some embodiments, generating a spectrally shaped time domain digital waveform includes performing an Inverse Fast Fourier Transform (IFFT) on a sum of the set of RF subcarriers. Notably, the spectrally shaped time domain digital waveform may include an in-phase waveform (also referred to as the I component of the waveform) and a quadrature phase waveform (also referred to as the Q component of the waveform). Preferably, operation 106 is performed digitally.

At operation 108, process 100 generates a spectrally shaped continuous time domain analog signal in response to the spectrally shaped time domain digital waveform. In some embodiments, a "continuous" analog signal may be generated by repeatedly applying the spectrally shaped time domain digital waveform. In some embodiments, the spectrally shaped time domain digital waveform is represented as a stream of bits (i.e., a bit stream) that, when applied to a digital-to-analog converter (DAC) will cause the DAC to generate an analog signal, i.e., the spectrally shaped continuous time domain analog signal, corresponding to the spectrally shaped time domain digital waveform.

At operation 110, process 100 generates a drive signal in response to the spectrally shaped continuous time domain analog signal. Process 100 generates a drive signal by mixing in-phase and quadrature components of the spectrally shaped continuous time domain analog signal. Notably, the drive signal is characterized by an energy of the drive signal being allocated over the specified frequencies of the subcarriers.

At operation 112, process 100 provides the drive signal generated at operation 110 (i.e., the drive signal characterized by the energy of the drive signal being allocated over the specified frequencies of the subcarriers) to a touch sensor, and more specifically, to transmitter lines of the touch sensor.

Figure 6:
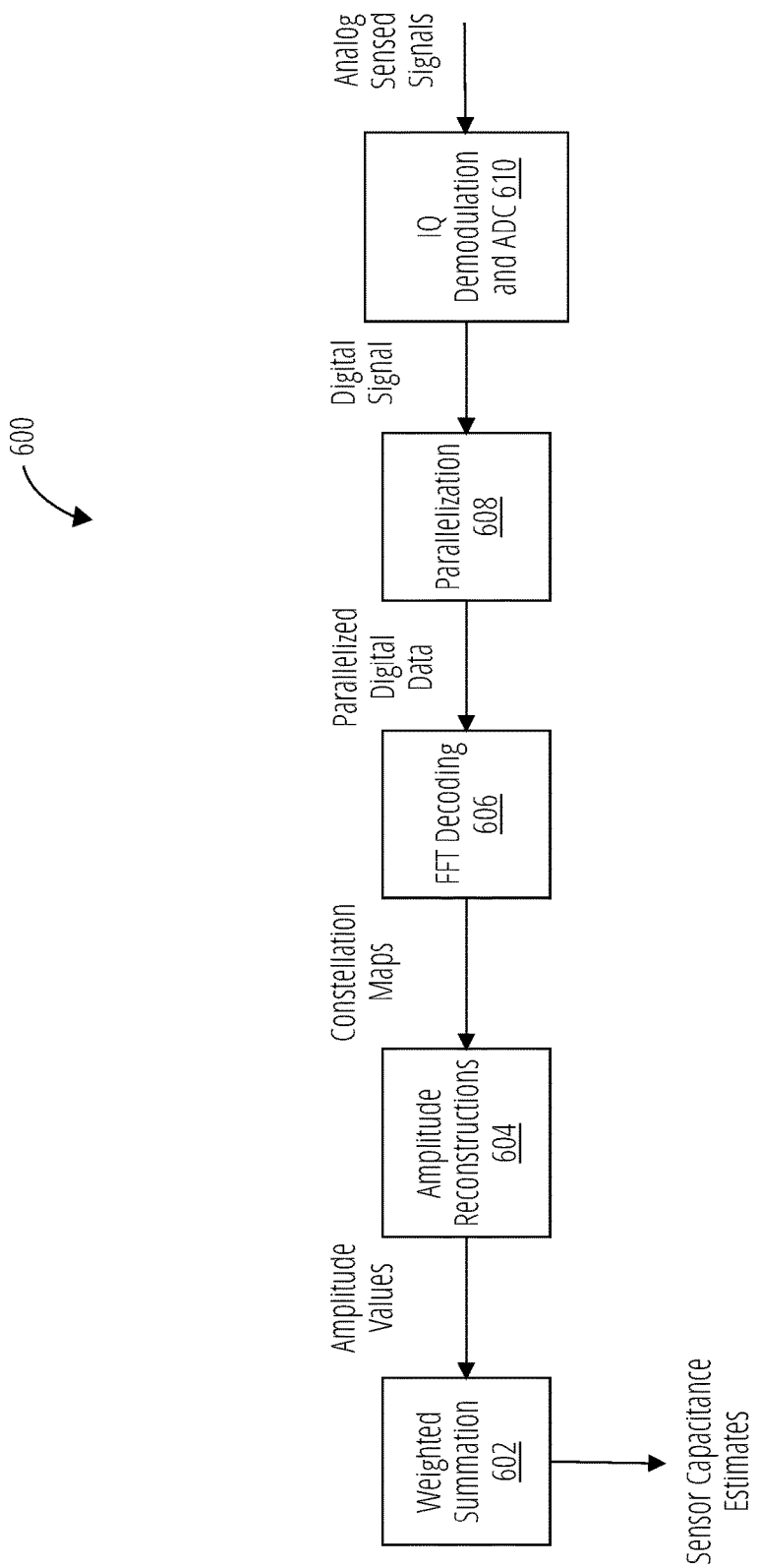
FIG. 6 is a functional block diagram of an embodiment of a receive path for receiving a spectrally shaped continuous time analog signal.

At operation 114, process 100 observes the energy of a sensed signal of the touch sensor. In some embodiments, the sensed signal may be received via receiver lines of a touch sensor while providing a drive signal generated in operation 110 to a touch sensor. Notably, the sensed signal received in response to the drive signal characterized by its energy allocated among several frequencies can also be characterized by an energy allocated among the frequencies of the subcarriers. In one or more embodiments, observing an energy of a sensed signal of the touch sensor may include one or more of IQ demodulation, parallelization, Inverse Fast Fourier Transform (IFFT) and/or Fast Fourier Transform (FFT) decoding, and amplitude reconstruction as depicted by FIG. 6.

At operation 116, process 100 observe a channel capacitance of the touch sensor in response to the observed energy of the sensed signals. In one or more embodiments, observing a channel capacitance of the touch sensor in response to the observed energy level of the sensed signal may include performing weighted summation of amplitude values to arrive at sensor capacitance estimates as depicted by FIG. 6.

At operation 118, process 100 detects a touch at the touch sensor in response to observing that the energy of the sensed signal is different than the energy of the drive signal. By way of non-limiting example of a contemplated touch sensing system, a difference may be due to attenuation of a drive signal due to an increase in channel capacitance caused by an object contacting a touch sensor.

As discussed herein, acceptable subcarriers at specified frequencies and amplitudes are chosen (e.g., operation 104 of FIG. 1) such that a spectrally shaped time domain digital waveform may be generated (e.g., operation 106 of FIG. 1).

Some embodiments relate, generally, to systems and methods for choosing RF subcarriers for a spectrally shaped time domain digital waveform, and more specifically, choosing respective amplitudes, phases, and frequencies for the RF subcarriers. In one embodiment, requirements (i.e., describing allowable EME) are received, as a non-limiting example, for one or more target applications of a touch sensor or a touch sensing system including a touch sensor and a touch controller configured to generate a spectrally shaped drive signal for the touch sensor via process 100. As noted above, such requirements may be, as non-limiting examples, EME limits or noise immunity requirements. Test frequencies, test amplitudes, and test phases are chosen. In one embodiment, test frequencies are chosen such that a given test frequency is orthogonal to the other test frequencies.

An RF subcarrier is orthogonal to another RF subcarrier if the cross-correlation of the subcarriers codes is essentially zero—i.e., the two RF subcarriers do not (or would not) interfere with each other, including without limitation constructive and destructive interference. As a non-limiting example, a property of orthogonal signals, and RF subcarriers more specifically, is that the dot product of the two signals is zero. While complete orthogonality may be desirable it may not be practical or necessary, so in some cases a designer may choose a suitable degree of orthogonality as needed.

An IFFT may be used to generate a time domain digital waveform (having in-phase and quadrature components) that represents the sum of the test RF subcarriers. The test frequencies, test amplitudes, and test phases may be checked by performing a time series of a continuous time domain analog drive signal corresponding to the time domain digital waveform and observing for spikes and/or EME. As a non-limiting example, spikes may be observed because the phase relationships among the RF subcarriers at the test frequencies are additive (i.e., amplitudes add constructively). In one embodiment, one or more test frequencies and test amplitudes may be chosen, at least in part, using constellation maps for representing respective RF signals modulated using one or more of QAM and phase-shift keying.

Figure 2:
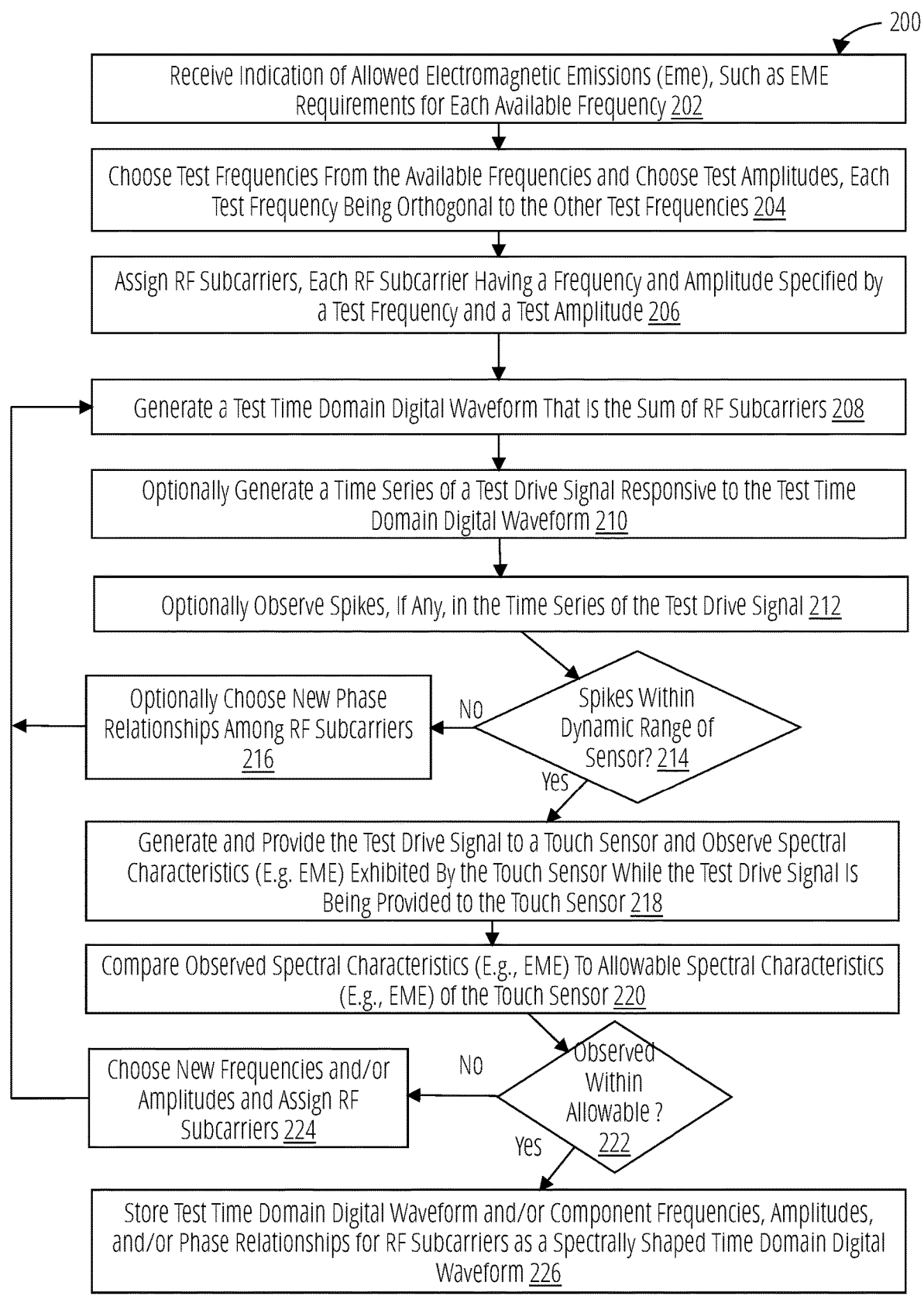
FIG. 2 is a process for choosing waveforms for modulating signals and choosing component frequencies that may be used to generate a spectrally shaped drive signal according to disclosed embodiments.

FIG. 2 shows an embodiment of a process 200 for choosing component frequencies and amplitudes for component RF test frequencies that may be used to generate a spectrally shaped time domain digital waveform for a spectrally shaped RF signal (e.g., a spectrally shaped drive signal).

At operation 202, process 200 receives an indication of allowable EME for each available frequency. In some embodiments, allowable EME may be described as EME requirements and may be set forth for each available frequency.

At operation 204, process 200 chooses test frequencies from the available frequencies and chooses test amplitudes. There is a phase relationship among the chosen test frequencies—in the specific non-limiting example process depicted by FIG. 2, each of the test frequencies is orthogonal to all of the other test frequencies.

At operation 206, process 200 assigns RF subcarriers. Each RF subcarrier has a frequency and amplitude specified by a test frequency and test amplitude of the chosen test frequencies and test amplitudes.

At operation 208, process 200 generates a test time domain digital waveform that is the sum of the RF subcarriers. In some embodiments, a test time domain digital waveform may be generated in the digital domain by performing an IFFT using respective test frequencies, test amplitudes, and/or phases relationships (discussed below) of the RF subcarriers.

At optional operation 210, process 200 generates a time series of a test drive signal responsive to the test time domain digital waveform.

In some cases, the phase relationships of the test frequencies of the RF subcarriers may result in spikes (i.e., amplitudes outside the dynamic range of, as non-limiting example, a touch sensor). At optional operation 212, process 200 observes spikes, if any, in the time series of the test drive signal. At optional operation 214, process 200 determines if all observed spikes are within the dynamic range of a touch sensor. If one or more observed spikes are determined to not be within the dynamic range of the touch sensor then, in operation 214, process 200 chooses new phase relationships among the test frequencies of specific RF subcarriers associated with the observed spikes outside the dynamic range of the sensor and loops back to operation 206.

If the observed spikes were determined to be within the dynamic range of the touch sensor, then at optional operation 218, process 200 generates and provides the test drive signal to a touch sensor and observes spectral characteristics (e.g., EME, noise, without limitation) exhibited by the touch sensor while the test drive signal is being provided to the touch sensor.

At operation 220, process 200 compares the observed spectral characteristics (e.g., EME, noise, without limitation) to the allowable spectral characteristics of the touch sensor.

At operation 222, process 200 determines if the observed spectral characteristics are within the allowable spectral characteristics. If process 200 determines that the observed spectral characteristics are not within the allowable spectral characteristics then, at operation 224, process 200 chooses new frequencies and/or amplitudes for the test frequencies and test amplitudes, assigns RF subcarriers and loops back to operation 208. If process 200 determines that the observed spectral characteristics are within the allowable spectral characteristics then, at operation 226, process 200 stores the time domain digital waveform of operation 208, and alternatively or additionally store component frequencies, amplitudes, and/or phase relationships for RF subcarriers. A time domain digital waveform determined in accordance with process 200 is a non-limiting example of a spectrally shaped time domain digital waveform. The stored time domain waveform corresponds to a quadrature amplitude modulated signal.

As discussed herein, test frequencies may be chosen using at least part of process 200 that have low cross correlation, and so have low interference—stated another way, the waveforms may be chosen to optimize a degree of orthogonality among test frequencies and ultimately among the respective frequencies of RF subcarriers that are chosen for generating drive signals for the sensor (i.e., that are stored in operation 226).

Figure 3:
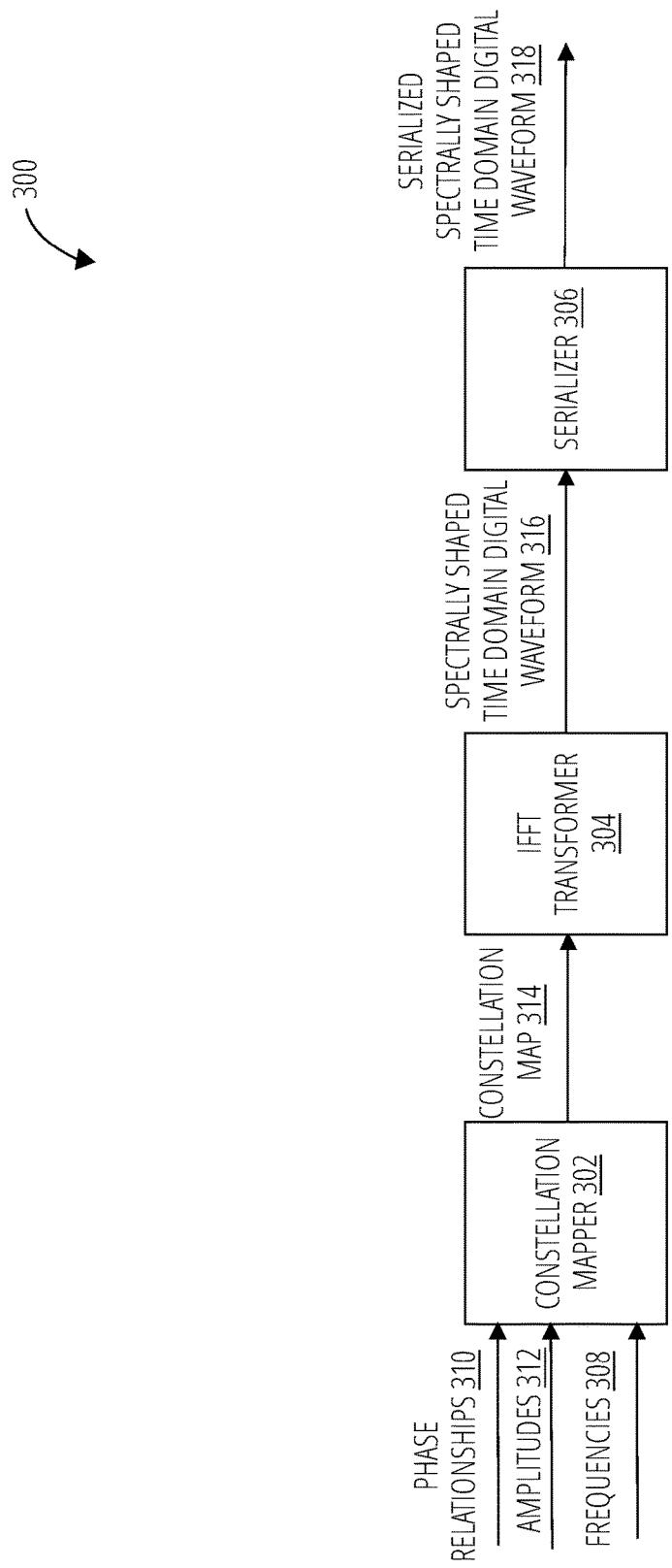
FIG. 3 is a functional block diagram depicting a process for generating an encoded digital signal that represents a spectrally shaped time domain waveform, in accordance with one or more embodiments.

FIG. 3 is a functional block diagram depicting a functional block 300 for generating an encoded digital signal (in the specific non-limiting example depicted by FIG. 3 a bitstream) where the information about a spectrally shaped time domain digital waveform is encoded on the digital signal.

The inputs to functional block 300 are phase relationships 310, amplitudes 312, and component frequencies 308 corresponding to a desired spectrally shaped time domain digital waveform. As discussed herein, a desired spectrally shaped time domain digital waveform may be a test waveform or a waveform that has been chosen for generating a drive signal.

In the embodiment depicted by FIG. 3, functional block 300 includes several functional blocks, which are further described below: constellation mapper 302, IFFT transformer 304, and serializer 306. Constellation Mapper 302 receives phase relationships 310, amplitudes 312, and component frequencies 308 and, in response, generates and provides constellation map 314. Any suitable technique for generating a constellation map known to a person having ordinary skill in the art may be performed by constellation mapper 302. IFFT transformer 304 receives constellation map 314 and, in response, generates a spectrally shaped time domain digital waveform 316 responsive to constellation map 314. The output of IFFT transformer 304 includes a real or "in-phase" part (denoted as the I component) and an imaginary or "quadrature" part (denoted as the Q component). Typically, the output of IFFT transformer 304 will be parallelized data. Serializer 306 receives the parallelized data, and, in response, generates a bitstream that represents the spectrally shaped time domain digital waveform 318 (in other words, a "serialized spectrally shaped time domain digital waveform 318").

In various embodiments, the time domain digital waveform 318 may be an encoded bitstream (i.e., a specific sequence of 1's and 0's) that, if repeatedly input to a digital-to-analog converter (DAC), causes the DAC to generate a continuous time domain analog signal corresponding to the time domain digital waveform 318.

In various embodiments, the time domain digital waveform 318 may be stored and used to generate spectrally shaped drive signals by a touch controller, including touch controller 402, as discussed herein.

Figure 4:
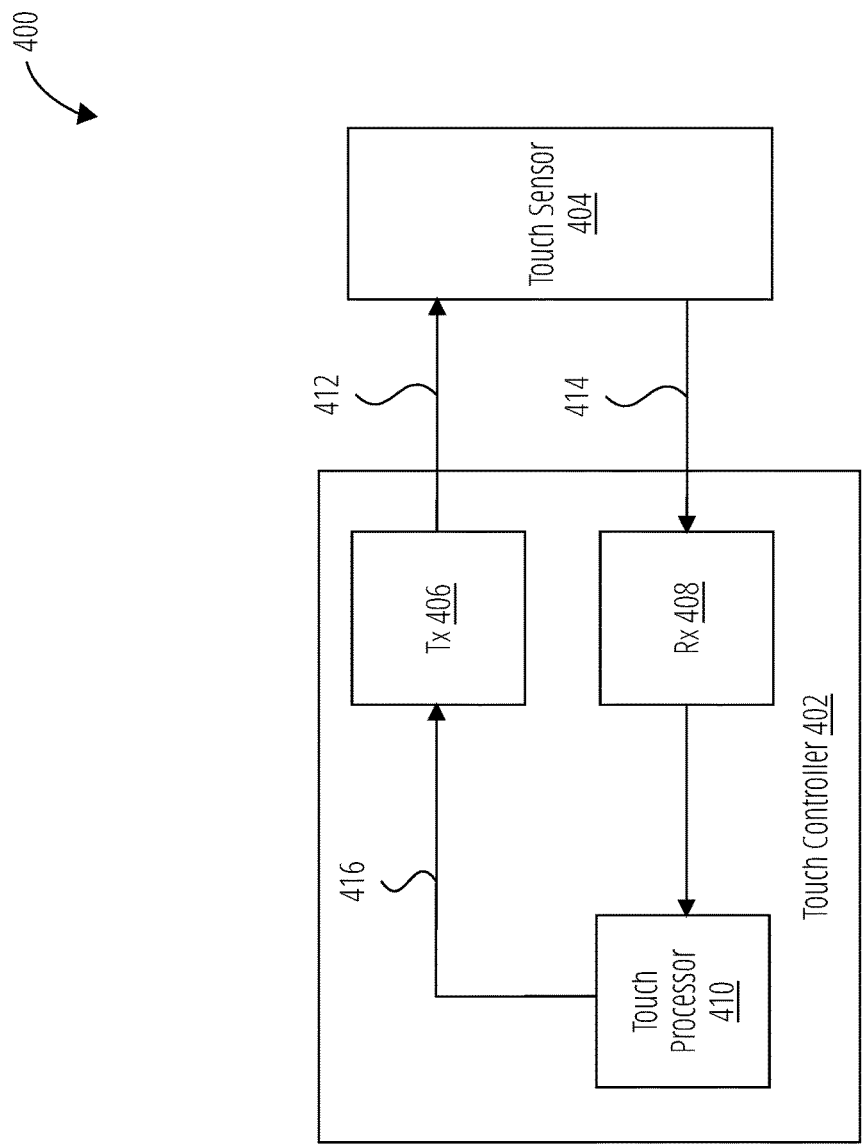
FIG. 4 is a block diagram of a touch sensing system configured to use drive signals, including spectrally shaped drive signals, in accordance with one or more disclosed embodiments.

FIG. 4 is a block diagram depicting a touch sensing system 400 configured to implement drive signals, including spectrally shaped drive signals generated in accordance with one or more embodiments. The example touch sensing system 400 depicted by FIG. 4 includes a touch controller 402 operatively coupled to a touch sensor 404 such that the touch controller 402 may be in electrical communication with touch sensor 404. Touch controller 402 may be configured to provide drive signals 412 to one or more sensor lines (e.g., drive lines, not shown) of the touch sensor 404 and to observe sensed signals 414 that are indicative of sensor capacitance on one or more sensor lines (e.g., sense lines, not shown). Touch controller 402 includes a transmit path 406 (Tx 406 in FIG. 4) configured to generate spectrally shaped drive signals according to one or more embodiments, as discussed herein. The touch controller also includes a receive path 408 (Rx 408 in FIG. 4) for receiving sensed signals 414 according to one or more embodiments, as discussed herein.

Notably, signals at Rx 408 and Tx 406 may be asynchronous relative to each other due to phase lag introduced by touch sensor 404. Stated another way, in disclosed embodiments, Rx 408 and Tx 406 do not necessarily have to be synchronized to compensate for phase lag introduced by touch sensor 404.

Touch controller 402 may be configured to store spectrally shaped time domain digital waveforms for generating spectrally shaped drive signals, such as spectrally shaped time domain digital waveform 318 of FIG. 3. In order to generate drive signals 412, touch processor 410 may be configured to provide drive control signal 416 to Tx 406. More specifically, drive control signal 416 may be the spectrally shaped time domain digital waveform stored at touch controller 402 and used by touch processor 410. More specifically still, the spectrally shaped time domain digital waveform may include an I component and a Q component, each stored at touch controller 402. Control signals 416 may be a bitstream that includes the spectrally shaped time domain digital waveform repeated as needed to generate a continuous waveform.

The transmit path, Tx 406, may be configured to generate the drive signals 412 responsive to the drive control signal 416, for example, as discussed with reference to FIG. 5. Drive signals 412 are spectrally shaped responsive to the drive control signal 416 being the spectrally shaped time domain digital waveform stored at touch controller 402.

Figure 5:
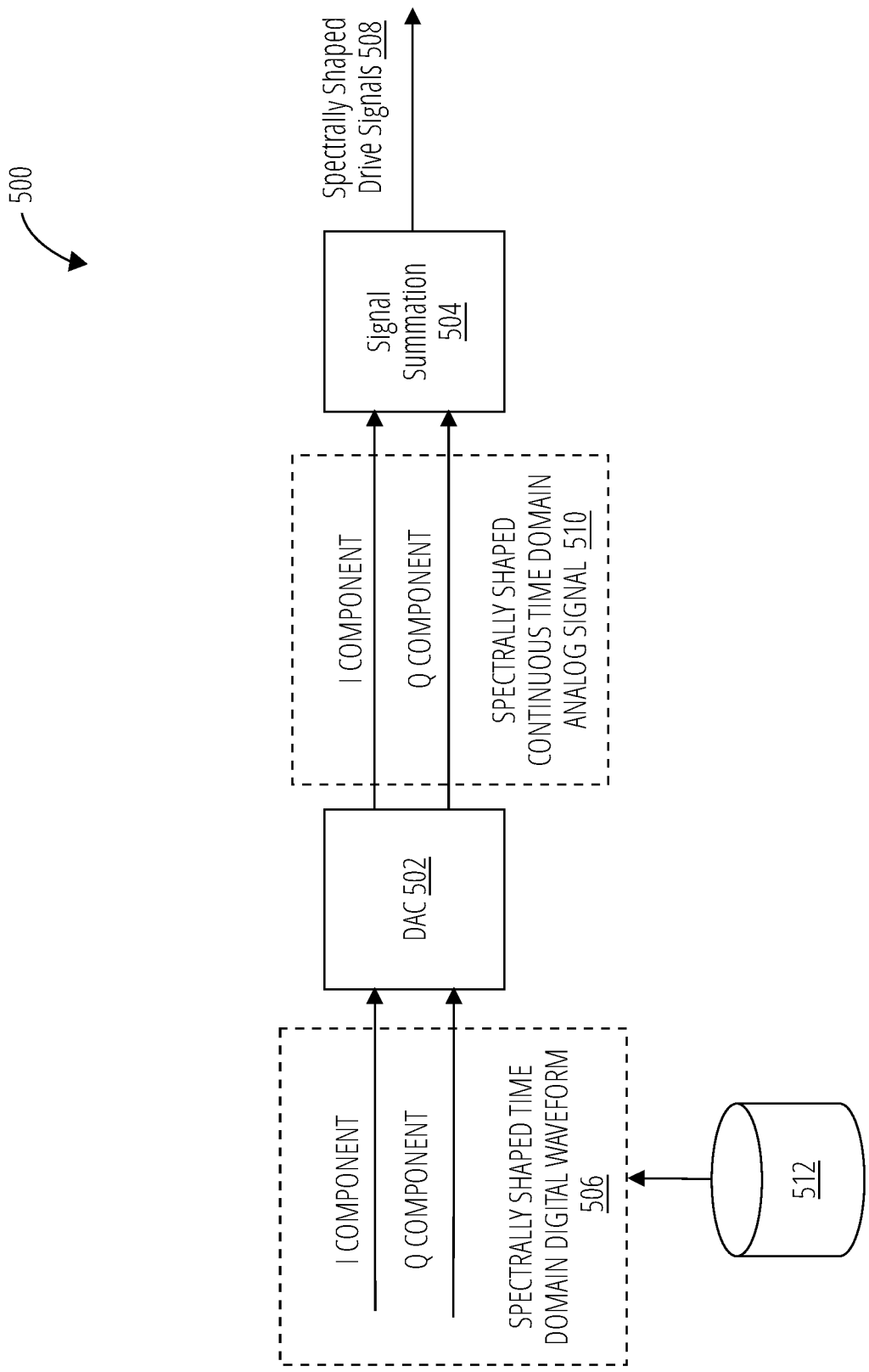
FIG. 5 is a functional block diagram of an embodiment of a transmit path of FIG. 3.

FIG. 5 is a functional block diagram depicting an embodiment of a transmit path 500 for generating a spectrally shaped drive signal. In some embodiments, a transmit path 406 (Tx 406) of FIG. 4 may be configured as a transmit path 500 of FIG. 5. In some embodiments, the transmit path 500 may be used to generate a drive signal for performing touch sensing operations. In some embodiments, the transmit path 500 may be used to generate a test drive signal such as test drive signals discussed with reference to FIG. 2.

As depicted by FIG. 5, the inputs to transmit path 500 are I and Q components of a spectrally shaped time domain digital waveform 506, in this specific example, stored at a computer readable memory 512. The spectrally shaped time domain digital waveform 506 may correspond to a serialized spectrally shaped time domain digital waveform generated by performing an IFFT and serialization, e.g., by IFFT transformer 304 and serializer 306, as described with reference to FIG. 3.

A digital-to-analog conversion (DAC) block 502 receives the serialized spectrally shaped time domain digital waveform 506 (more specifically, the I and Q components thereof) and, in response, generates I and Q components of a spectrally shaped continuous time domain analog signal 510. A signal summation block 504 receives the I and Q components of the spectrally shaped continuous time domain analog signal 510 and, in response, generates a spectrally shaped drive signal(s) 508. More specifically, at signal summation block 504, the I and Q components of spectrally shaped continuous time domain analog signal 510 are mixed to produce an IQ-modulated output waveform.

Optionally, additional RF modulation of this baseband signal (i.e., the spectrally shaped continuous time domain analog signal 508) may be performed as needed.

FIG. 6 is a functional block diagram depicting a receive path 600 for receiving a spectrally shaped continuous time domain analog signal, in accordance with one or more embodiments. As a non-limiting example, a received spectrally shaped continuous time domain analog signal of receive path 600 may be a spectrally shaped continuous time domain analog signal 508 (FIG. 5), and more specifically, a sensed signal comprising the same. In some embodiments, a receive path of a touch controller, such as Rx 408 for touch controller 402, may be configured as a receive path 600.

IQ demodulation and ADC block 610 receives analog sensed signals including I and Q components and generates a digital signal including I and Q information by performing analog-to-digital conversion and IQ demodulation on sensed signals.

Parallelization block 608 generates parallelized digital data (I and Q) in response to the digital I and Q components and a length of the IFFT/FFT sequence that defines the set of orthogonal carriers and expected by FFT decoding block 606. Parallelization block 608 provides the I and Q components of the parallelized digital data to the I and Q inputs, respectively, of the FFT decoding block 606.

FFT decoding block 606 generates constellation maps responsive to respective I and Q components of the parallelized digital data received at its I and Q inputs, and more specifically, by applying FFT to the parallelized digital data.

An amplitude reconstruction block 604 generates amplitude values for constellation maps output by the FFT decoding block 606. In one embodiment, amplitude values may be indicative of an amount or degree of attenuation of one or more component RF signals used to generate a drive signal.

A weighted summation block 602 outputs sensor capacitance estimate(s) in response to the amplitude values. In one embodiment, a touch processor (such as the touch processor 410 of FIG. 4) may be configured to detect touches responsive to the sensor capacitance estimates, for example, by observing that a sensor capacitance estimate exceeds a specified threshold for detecting a touch.

Figure 7:
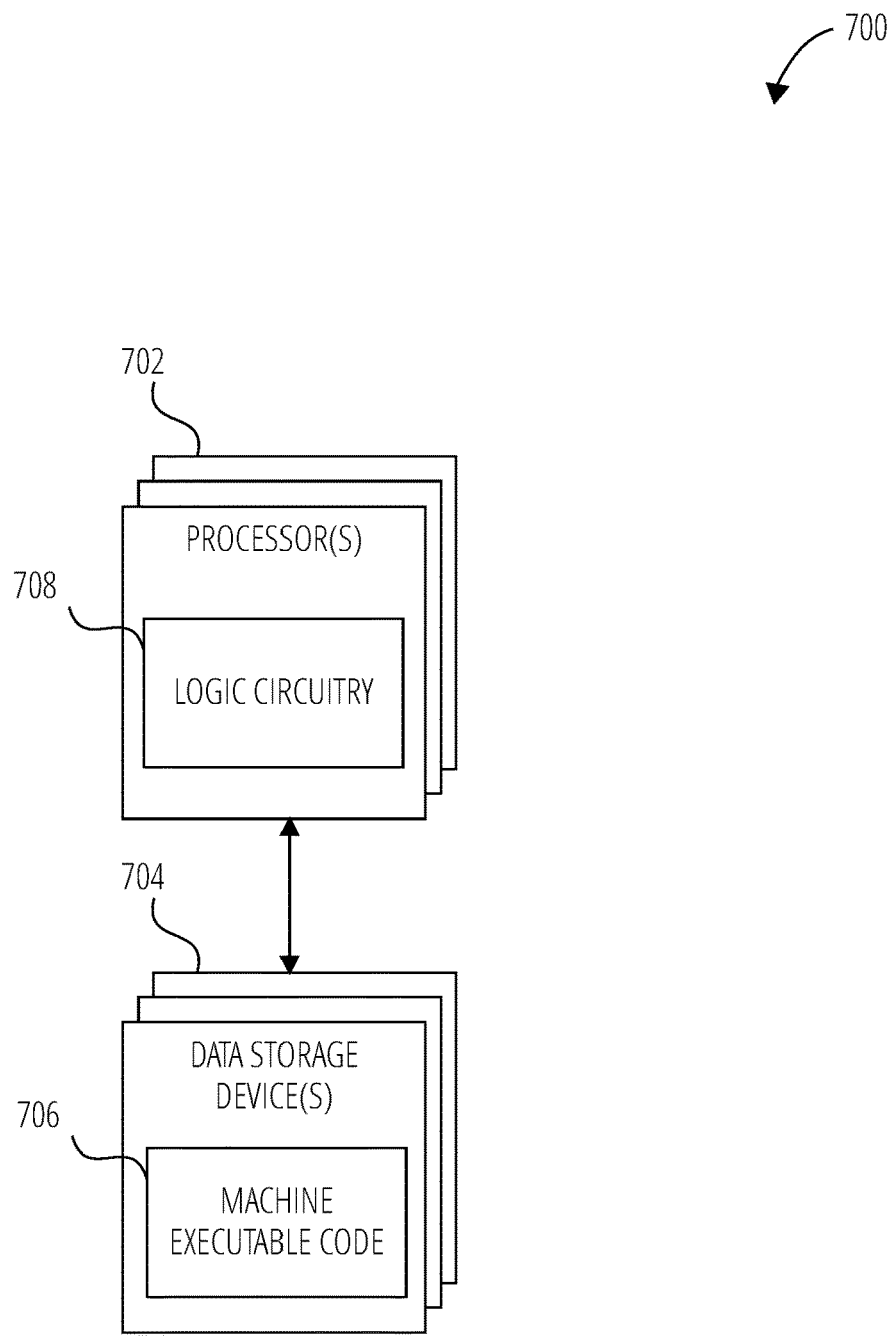
FIG. 7 is a block diagram of circuitry that, in some embodiments, may be used to implement various functions, operations, acts, algorithms, methods and/or processes described herein.

FIG. 7 is a block diagram of circuitry 700 that, in some embodiments, may be used to implement various functions, operations, acts, processes, and/or methods disclosed herein. The circuitry 700 includes one or more processors 702 (sometimes referred to herein as "processors 702") operably coupled to one or more data storage devices (sometimes referred to herein as "storage 704"). The storage 704 includes machine executable code 706 stored thereon and the processors 702 include logic circuitry 708. The machine executable code 706 include information describing functional elements that may be implemented by (e.g., performed by) the logic circuitry 708.

The logic circuitry 708 is adapted to implement (e.g., perform) the functional elements described by the machine executable code 706. The circuitry 700, when executing the functional elements described by the machine executable code 706, should be considered as special purpose hardware configured for carrying out functional elements disclosed herein. In some embodiments the processors 702 may be configured to perform the functional elements described by the machine executable code 706 sequentially, concurrently (e.g., on one or more different hardware platforms), or in one or more parallel process streams.

When implemented by logic circuitry 708 of the processors 702, the machine executable code 706 is configured to adapt the processors 702 to perform operations of embodiments disclosed herein. For example, the machine executable code 706 may be configured to adapt the processors 702 to perform at least a portion or a totality of process 100 of FIG. 1, process 200 of FIG. 2, a transmit path 500 of FIG. 5 and a receive path 600 of FIG. 6. As another example, the machine executable code 706 may be configured to adapt the processors 702 to perform at least a portion or a totality of the operations discussed for functional block 300 of FIG. 3, touch controller 402, Tx path 406, Rx path 408, and/or touch processor 410 of FIG. 4.

The processors 702 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute computing instructions (e.g., software code) related to embodiments of the present disclosure.

It is noted that a general-purpose processor may be a microprocessor, but in the alternative, the processors 702 may include any conventional processor, controller, microcontroller, or state machine. The processors 702 may also be implemented as a combination of computing devices, such as a combination of a DSP and a microprocessor, a plurality of microprocessors, one or more microprocessors in conjunction with a DSP core, or any other such configuration.

In some embodiments the storage 704 includes volatile data storage (e.g., random-access memory (RAM)), non-volatile data storage (e.g., Flash memory, a hard disc drive, a solid state drive, erasable programmable read-only memory (EPROM), etc.). In some embodiments the processors 702 and the storage 704 may be implemented into a single device (e.g., a semiconductor device product, a system on chip (SOC), etc.). In some embodiments the processors 702 and the storage 704 may be implemented into separate devices.

In some embodiments the machine executable code 706 may include computer-readable instructions (e.g., software code, firmware code). By way of non-limiting example, the computer-readable instructions may be stored by the storage 704, accessed directly by the processors 702, and executed by the processors 702 using at least the logic circuitry 708. Also by way of non-limiting example, the computer-readable instructions may be stored on the storage 704, transferred to a memory device (not shown) for execution, and executed by the processors 702 using at least the logic circuitry 708. Accordingly, in some embodiments the logic circuitry 708 includes electrically configurable logic circuitry 708.

In some embodiments the machine executable code 706 may describe hardware (e.g., circuitry) to be implemented in the logic circuitry 708 to perform the functional elements. This hardware may be described at any of a variety of levels of abstraction, from low-level transistor layouts to high-level description languages. At a high-level of abstraction, a hardware description language (HDL) such as a hardware description language (HDL) adopted by the Institute Of Electrical and Electronics Engineers (IEEE) may be used, without limitation. By way of non-limiting examples, Verilog™, SystemVerilog™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 708 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some embodiments the machine executable code 706 may include an HDL, an RTL, a GL description, a mask level description, other hardware description, or any combination thereof.

In embodiments where the machine executable code 706 includes a hardware description (at any level of abstraction), a system (not shown, but including the storage 704) may be configured to implement the hardware description described by the machine executable code 706. By way of non-limiting example, the processors 702 may include a programmable logic device (e.g., an FPGA or a PLC) and the logic circuitry 708 may be electrically controlled to implement circuitry corresponding to the hardware description into the logic circuitry 708. Also by way of non-limiting example, the logic circuitry 708 may include hard-wired logic manufactured by a manufacturing system (not shown, but including the storage 704) according to the hardware description of the machine executable code 706.

Regardless of whether the machine executable code 706 includes computer-readable instructions or a hardware description, the logic circuitry 708 is adapted to perform the functional elements described by the machine executable code 706 when implementing the functional elements of the machine executable code 706. It is noted that although a hardware description may not directly describe functional elements, a hardware description indirectly describes functional elements that the hardware elements described by the hardware description are capable of performing.

Any characterization in this disclosure of something as "typical," "conventional," or "known" does not necessarily mean that it is disclosed in the prior art or that the discussed aspects are appreciated in the prior art. Nor does it necessarily mean that, in the relevant field, it is widely known, well-understood, or routinely used.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

One or more non-limiting embodiments of the disclosure include:

Embodiment 1: a touch sensing method, comprising: generating a drive signal characterized by an energy of the drive signal being allocated over specified frequencies of subcarriers; providing the drive signal to a touch sensor; receiving a sensed signal of the touch sensor; observing an energy of the sensed signal; and detect a touch at the touch sensor responsive to observing that an observed energy of the sensed signal is different than an energy of the drive signal.

Embodiment 2: the touch sensing method of Embodiment 1, wherein the generating the drive signal characterized by the energy of the drive signal being allocated over specified frequencies comprises: generating a spectrally shaped continuous time domain analog signal; and generating the drive signal responsive to the spectrally shaped continuous time domain analog signal.

Embodiment 3: the touch sensing method of Embodiments 1 and 2, wherein the generating the drive signal responsive to the spectrally shaped continuous time domain analog signal comprises: mixing in-phase and quadrature-phase components of the spectrally shaped continuous time domain analog signal.

Embodiment 4: the touch sensing method of Embodiments 1 to 3, further comprising: observing a channel capacitance of the touch sensor responsive to the observed energy of the sensed signal.

Embodiment 5: the touch sensing method of Embodiments 1 to 4, further comprising: detecting a touch at the touch sensor responsive to observing a change in the channel capacitance of the touch sensor.

Embodiment 6: the touch sensing method of Embodiments 1 to 5, wherein the generating the drive signal characterized by the energy of the drive signal being allocated over specified frequencies comprises generating a spectrally shaped drive signal chosen such that the touch sensor exhibits spectral characteristics at multiple frequencies, wherein the spectral characteristics are within indications of allowable spectral characteristics.

Embodiment 7: a touch sensing system, comprising: a touch sensor; and a touch controller configured to: generate a drive signal characterized by an energy of the drive signal being allocated over specified frequencies of subcarriers; provide the drive signal to the touch sensor; observe an energy of sensed signals received from the touch sensor; and detect a touch at the touch sensor responsive to observing that an observed energy of the sensed signals is different than an energy of the drive signal.

Embodiment 8: the touch sensing system of Embodiment 7, wherein the generation of the drive signal characterized by the energy of the drive signal being allocated over specified frequencies comprises: generate a spectrally shaped continuous time domain analog signal; and generate the drive signal responsive to the spectrally shaped continuous time domain analog signal.

Embodiment 9: the touch sensing system of Embodiments 7 and 8, wherein the generation of the drive signal responsive to the spectrally shaped continuous time domain analog signal comprises: mix in-phase and quadrature-phase components of the spectrally shaped continuous time domain analog signal.

Embodiment 10: the touch sensing system of Embodiments 7 to 9, wherein the touch controller is further configured to: observe a channel capacitance of the touch sensor responsive to the observed energy of the sensed signals.

Embodiment 11: the touch sensing system of Embodiments 7 to 10, wherein the generation of the drive signal characterized by the energy of the drive signal being allocated over specified frequencies comprises: generate a spectrally shaped drive signal chosen such that the touch sensor exhibits spectral characteristics at multiple frequencies, wherein the spectral characteristics are within indications of allowable spectral characteristics.

Embodiment 12: a method of determining a spectrally shaped waveform, the method comprising: receiving an indication of allowable electromagnetic emissions; choosing radio frequency subcarriers responsive to the indication of allowable electromagnetic emissions; and generating and storing a spectrally shaped time domain digital waveform responsive to the chosen radio frequency subcarriers.

Embodiment 13: the method of Embodiment 12, further comprising: performing quadrature amplitude modulation using the radio frequency subcarriers.

Embodiment 14: the method of Embodiments 12 and 13, further comprising: choosing, for each of the radio frequency subcarriers, a specified amplitude and a specified frequency.

Embodiment 15: the method of Embodiments 12 to 14, wherein the choosing the radio frequency subcarriers responsive to the indication of allowable electromagnetic emissions comprises: choosing test frequencies and test amplitudes; generating a test time domain digital waveform of a test drive signal responsive to the radio frequency subcarriers, each radio frequency subcarrier having a frequency and amplitude specified by a respective chosen test frequency and a test amplitude; generating the test drive signal; providing the generated test drive signal to a touch sensor; and storing the test time domain digital waveform of the test drive signal responsive to detecting that an observed electromagnetic emissions of the touch sensor is within an allowable electromagnetic emissions.

Embodiment 16: the method of Embodiments 12 to 15, further comprising: generating a time series of the test drive signal responsive to the test time domain digital waveform; and observing spikes, if any, in the time series of the test drive signal.

Embodiment 17: the method of Embodiments 12 to 16, further comprising: choosing a new phase relationship among the radio frequency subcarriers responsive to observing one more of the observed spikes are outside a dynamic range of a touch sensor.

Embodiment 18: the method of Embodiments 12 to 17, further comprising: generating a bit stream responsive to the spectrally shaped time domain digital waveform; and storing the bit stream at a touch controller.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

I claim:

1. A touch sensing method, comprising:
   generating a drive signal characterized by an energy of the drive signal being allocated over specified frequencies of subcarriers;
   providing the drive signal to a touch sensor;
   receiving a sensed signal of the touch sensor;
   observing an energy of the sensed signal; and
   detect a touch at the touch sensor responsive to observing that an observed energy of the sensed signal is different than an energy of the drive signal.

2. The touch sensing method of claim 1, wherein the generating the drive signal characterized by the energy of the drive signal being allocated over specified frequencies comprises:
   generating a spectrally shaped continuous time domain analog signal; and
   generating the drive signal responsive to the spectrally shaped continuous time domain analog signal.

3. The touch sensing method of claim 2, wherein the generating the drive signal responsive to the spectrally shaped continuous time domain analog signal comprises:
   mixing in-phase and quadrature-phase components of the spectrally shaped continuous time domain analog signal.

4. The touch sensing method of claim 1, further comprising:
   observing a channel capacitance of the touch sensor responsive to the observed energy of the sensed signal.

5. The touch sensing method of claim 4, further comprising:
   detecting a touch at the touch sensor responsive to observing a change in the channel capacitance of the touch sensor.

6. The touch sensing method of claim 1, wherein the generating the drive signal characterized by the energy of the drive signal being allocated over specified frequencies comprises generating a spectrally shaped drive signal chosen such that the touch sensor exhibits spectral characteristics at multiple frequencies, wherein the spectral characteristics are within indications of allowable spectral characteristics.

7. A touch sensing system, comprising:
   a touch sensor; and
   a touch controller configured to:
      generate a drive signal characterized by an energy of the drive signal being allocated over specified frequencies of subcarriers;
      provide the drive signal to the touch sensor;
      observe an energy of a sensed signal received from the touch sensor; and
      detect a touch at the touch sensor responsive to observing that an observed energy of the sensed signal is different than an energy of the drive signal.

8. The touch sensing system of claim 7, wherein the generation of the drive signal characterized by the energy of the drive signal being allocated over specified frequencies comprises:
   generate a spectrally shaped continuous time domain analog signal; and
   generate the drive signal responsive to the spectrally shaped continuous time domain analog signal.

9. The touch sensing system of claim 8, wherein the generation of the drive signal responsive to the spectrally shaped continuous time domain analog signal comprises:
   mix in-phase and quadrature-phase components of the spectrally shaped continuous time domain analog signal.

10. The touch sensing system of claim 7, wherein the touch controller is further configured to:
    observe a channel capacitance of the touch sensor responsive to the observed energy of the sensed signals.

11. The touch sensing system of claim 7, wherein the generation of the drive signal characterized by the energy of the drive signal being allocated over specified frequencies comprises:
    generate a spectrally shaped drive signal chosen such that the touch sensor exhibits spectral characteristics at multiple frequencies, wherein the spectral characteristics are within indications of allowable spectral characteristics.

* * * * *